United States Patent [19]

Jones

[11] Patent Number: 4,666,335

[45] Date of Patent: May 19, 1987

[54] POND SPRING

[76] Inventor: Ivan J. R. Jones, Star Route, Grovespring, Mo. 65662

[21] Appl. No.: 658,430

[22] Filed: Oct. 5, 1984

[51] Int. Cl.$^4$ ............................................. E02B 15/02
[52] U.S. Cl. ...................................... 405/61; 405/52; 417/61
[58] Field of Search ....................... 405/22, 52, 61, 62, 405/74, 217; 417/424, 14, 61; 415/7

[56] References Cited

U.S. PATENT DOCUMENTS 3,373,821  3/1968  Sare .................................. 405/61 X
4,089,620  5/1978  Ravitts .................................. 417/61

Primary Examiner—Cornelius J. Husar
Assistant Examiner—Nancy J. Stodola
Attorney, Agent, or Firm—Senniger, Powers, Leavitt and Roedel

[57] ABSTRACT

A water circulating device designed to be installed in a pond or the like for circulating warmer subsurface water to the surface to prevent freeze-over of the pond. The device comprises a framework having a base section which rests on the floor of the pond and an upright section extending up from the base section, a long substantially rigid water conduit mounted on the base section for pivoting about a generally horizontal axis, a pump for pumping water through the conduit from its intake end to its discharge end, and a float connected to the conduit and mounted for up and down movement on the upright section of the framework whereby when the framework is in the water the float rises and pivots the conduit to an inclined position in which the intake end of the conduit is disposed for intake of warmer subsurface water and the discharge end is disposed for discharge of the warmer water at a location adjacent the surface of the water to prevent freeze-over of the pond.

10 Claims, 2 Drawing Figures

POND SPRING

BACKGROUND OF THE INVENTION

The present invention relates generally to water circulating devices and more particularly to a device adapted for preventing freeze-over of a body of water by circulating relatively warm subsurface water up to the surface.

This invention has particular (albeit not exclusive) application to farm ponds which are relied upon to supply drinking water to livestock year round. During periods of subfreezing weather, preventing such ponds from freezing over is an essential but very costly operation.

SUMMARY OF THE INVENTION

Among the several objects of this invention may be noted the provision of an improved device for preventing freeze-over of a body of water, such as a farm pond, by circulating relatively warm subsurface water to the surface, thereby enabling livestock to drink from the pond during freezing weather; the provision of such a device which does not rely on wind or air movement to circulate the water; the provision of such a device the operation of which is controlled according to the temperature of the water; the provision of such a device which is weather and corrosion resistant; the provision of such a device which is lightweight and portable; and the provision of such a device which is adustable to keep selected areas of water (e.g., areas close to the bank) ice-free.

Generally, a water circulating device of the present invention is adapted to be installed in a pond or the like and to circulate relatively warm subsurface water to the surface of the pond to prevent freeze-over. The device comprises a framework having a base section adapted to rest on the floor of the pond and an upright section extending up from the base section, a long substantially rigid water conduit mounted on the base section for pivoting about a generally horizontal axis, means for pumping water through said conduit from one end of the conduit, constituting its intake end, to its other end, constituting its discharge end, and float means connected to said conduit and mounted for up and down movement on the upright section of the framework whereby when the framework is in the water the float means is adapted to rise and thereby pivot the conduit about said axis to an inclined position relative to the surface of the water in which the intake end of the conduit is disposed for intake of relatively warm subsurface water and the discharge end is disposed for discharge of the relatively warm water at a location adjacent the surface of the water to prevent freeze-over of the pond.

Other objects and features will be in part apparent and in part pointed out hereinafter.

BRIEF DESCRIPTION OF THE DRAWINGS

Corresponding reference numerals indicate corresponding parts throughout the several views of the drawings.

DESCRIPTION OF THE PREFERRED EMBODIMENT

Figure 1:
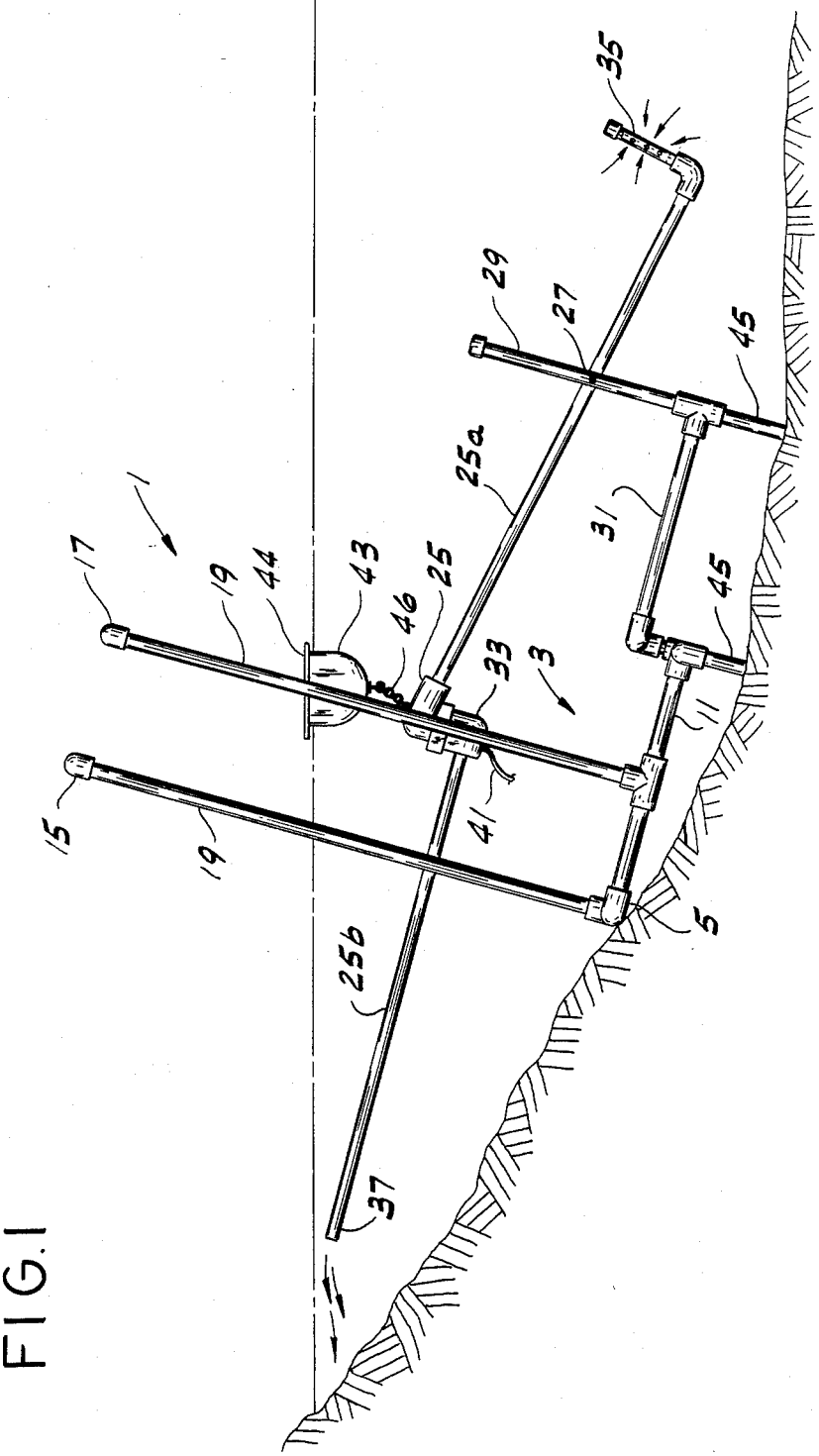
FIG. 1 is an elevational view showing a water circulating device of the present invention installed in a farm pond.
Figure 2:
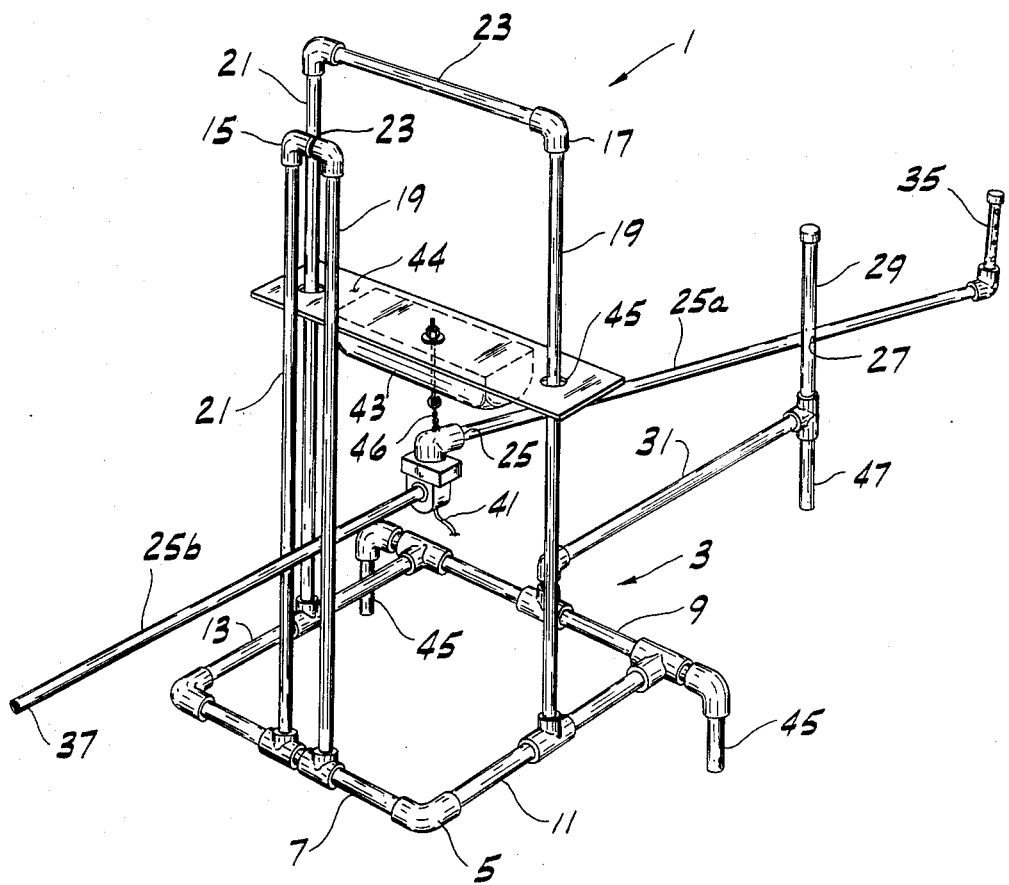
FIG. 2 is a perspective of the device of FIG. 1.

Referring now to the drawings, a water circulating device of the present invention is indicated in its entirety by the reference numeral 1. The device is shown in FIG. 1 installed in a body of water (e.g., a farm pond) relatively close to the bank. As explained below, the purpose of the device is to circulate the warmer subsurface water to the surface and thereby prevent freeze over of the water.

More specifically, the device 1 comprises a framework generally designated 3, including a generally rectangular base section 5 having a front 7, rear 9 and opposite sides 11, 13, a first upright section 15 extending up at the front of the base section, and a second upright section 17 extending up from opposite sides 11, 13 of the base section. Both upright sections 15, 17 include a pair of spaced-apart upright members 19, 21 connected at their upper ends by a horizontal crosspiece 23.

The device also includes a long rigid water conduit 25 pivoted at 27 on an arm 29 extending up from a rearward extension 31 of the base section 5, the arrangement being such that the conduit is adapted to swing about a generally horizontal axis. The conduit 25 extends forward from pivot 27 between the vertical members of the upright sections 15, 17. It will be noted in this regard that the spacing between the vertical members 19, 21 of the front upright section 15 is not substantially greater than the diameter of the conduit, thereby preventing substantial side-to-side sway of the conduit in the water. A submersible electric pump 33 is provided for pumping water from the intake (right) end 35 of the conduit to its discharge (left) end 37. By way of example, the pump may be a 360 gallons/hour pump with a 1 in. inlet and a ½ in. discharge. As shown, conduit 25 preferably comprises two separate pipes—an intake pipe 25a connected to the intake side of the pump 33 and an outlet pipe 25b connected to the discharge side of the pump. Pump 33 is adapted for connection to any suitable AC or DC power source (such as a 12-volt DC battery) by a suitable power chord 41. A conventional thermostat (not shown) may be used to control the operation of the pump according to the water temperature adjacent the discharge end of the conduit 25. The pump also preferably has a manual override switch (not shown) to bypass the thermostat control.

Indicated at 43 is float means comprising a float of suitable flotation material, such as styrofoam, mounted on the underside of a plate 44 extending between the upright members 19, 21 of the rear upright section 17. The upright members 19, 21 extend through holes 45 in the plate 44 to permit up and down movement of the float relative to the framework. Water conduit 25 is attached to the float by means of a line 46 (e.g., a rope or chain). The arrangement is such that the float will maintain the water conduit 25 in the inclined position shown in Fig. 1 wherein its intake end 35 is disposed in relatively warm subsurface water and its discharge end 37 is disposed immediately below the surface of the water.

Two legs, each designated 45, extend down from the rear of the base section 5 to support it above the ground as shown in FIG. 1. A third leg 47 aligned with arm 29 extends down from extension 31 to maintain the intake end 35 of the conduit 25 above the floor of the pond to prevent fouling of the pump with mud and other contaminants.

The framework 3 and water conduit 25 of the present invention may be constructed of tubular members or pipes interconnected by suitable fittings (e.g., elbows, tees, etc.). These parts are preferably of a lightweight plastic material, such as PVC, which will not corrode in water.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A water circulating device adapted to be installed in a pond or the like for circulating relatively warm subsurface water to the surface of the pond to prevent freeze-over, said device comprising a framework having a base section adapted to rest on the floor of the pond and an upright section extending up from the base section, a long substantially rigid water conduit mounted on the base section for pivoting about a generally horizontal axis, means for pumpisng water through said conduit from one end of the conduit, constituting its intake end, to its other end, constituting its discharge end, and float means connected to said conduit and mounted for up and down movement on the upright section of the framework whereby when said framework is in the water said float means is adapted to rise and thereby pivot the conduit to an inclined position relative to the surface of the water in which the intake end of the conduit is disposed for intake of relatively warm subsurface water and the discharge end is disposed for discharge of the relatively warm water at a location adjacent the surface of the water to prevent freeze-over of the pond.

2. A water circulating device as set forth in claim 1 further comprising thermostat means for controlling the operation of said pumping means according to the temperature of the water.

3. A water circulating device as set forth in claim 1 wherein said upright section of the framework comprises a pair of spaced-apart upright members extending up from the base section, and wherein said water conduit extends between the uprights.

4. A water circulating device as set forth in claim 3 wherein said float means is slidably secured to said upright members.

5. A water circulating device as set forth in claim 1 wherein said framework comprises a series of interconnected plastic tubular members.

6. A water circulating device as set forth in claim 1 wherein said base section of the framework has a front, a rear and opposite sides, said conduit being pivoted at the rear of the base section and extending forwardly therefrom.

7. A water circulating device as set forth in claim 6 wherein said upright section of the framework comprises a pair of spaced-apart upright members extending up from the base section at opposite sides of the base, and wherein said conduit extends in front-to-rear direction with respect to the base section between the uprights.

8. A water circulating device as set forth in claim 7 wherein said float means is slidably secured to said upright members.

9. A water circulating device as set forth in claim 6 further comprising legs extending down from the rear of the base section for supporting the rear of the base section above the ground.

10. A water circulating device as set forth in claim 6 further comprising an extension at the rear of said base section having an arm extending upwardly therefrom, said conduit being pivoted on said arm.

* * * * *